E. F. W. ALEXANDERSON.
DYNAMO ELECTRIC MACHINE.
APPLICATION FILED JUNE 19, 1913.

1,092,420.

Patented Apr. 7, 1914.

Witnesses

Inventor
Ernst F. W. Alexanderson
by
His Attorney

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

DYNAMO-ELECTRIC MACHINE.

1,092,420. Specification of Letters Patent. Patented Apr. 7, 1914.

Application filed June 19, 1913. Serial No. 774,501.

*To all whom it may concern:*

Be it known that I, ERNST F. W. ALEXANDERSON, a citizen of the United States, residing at Schenectady, county of Schenectady, State of New York, have invented certain new and useful Improvements in Dynamo-Electric Machines, of which the following is a specification.

My invention relates to dynamo-electric machines and in particular to machines for the production of alternating current of relatively high frequency.

The object of my invention is to provide an improved construction of dynamo-electric machine for the production of relatively high frequency alternating current.

More particularly the object of my invention is to provide an improved construction of magnetic field member for such a machine which is mechanically rigid and which reduces to a negligible factor the objectionable noise heretofore characteristic of such a machine.

A further object of my invention is to provide a self-contained dynamo-electric machine for the conversion of poly-phase alternating current of commercial frequency into single-phase alternating current of relatively high frequency.

The features of my invention which I consider to be novel and patentable are definitely indicated in the claims appended hereto.

Figure 1:
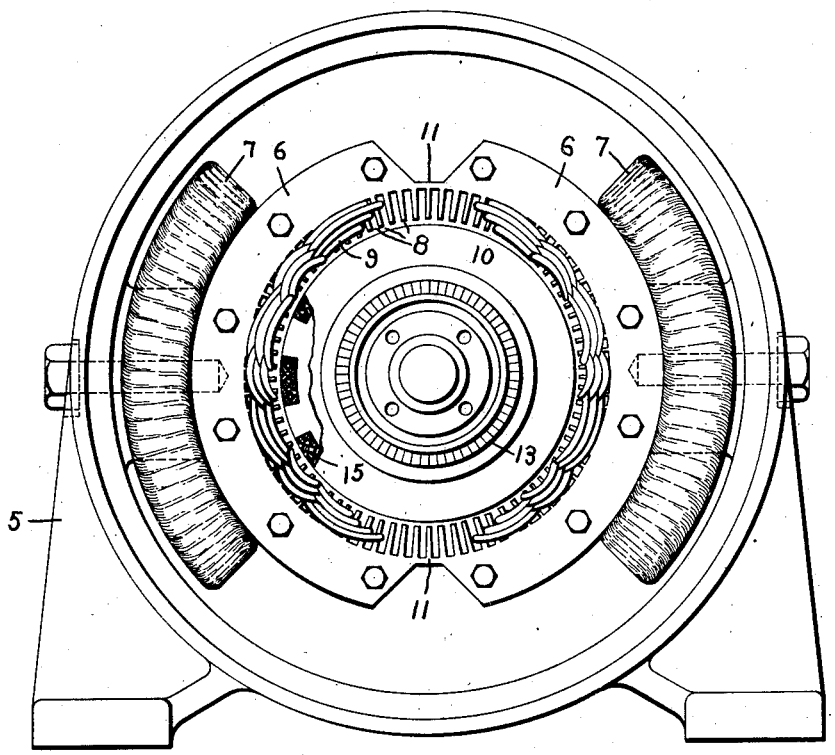
Figure 2:
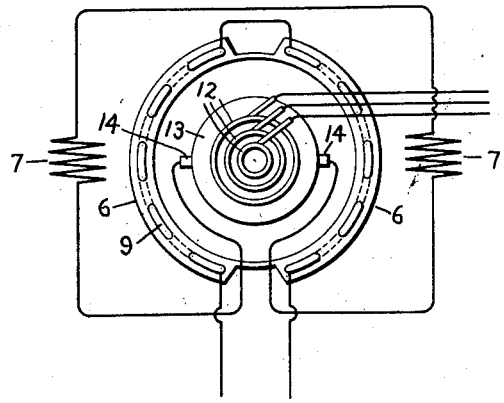

The features of construction and mode of operation of a dynamo-electric machine embodying my invention will be understood from the following description taken in connection with the accompanying drawings in which:

Figure 1 is an end elevation of a dynamo-electric machine embodying the novel features of my invention, and Fig. 2 is a diagrammatic view showing the electrical relation and connections of the operative elements of such machine.

The frame 5 of the machine forms a support for a stationary magnetic field member. This member is composed of polar members 6 having magnetizing windings 7 suitably mounted thereon. In the drawings I have shown a bi-polar machine but it will be understood that my invention is adapted to be embodied in a machine of any number of poles. The inner face of each polar member is provided with teeth 8 and a winding 9 is carried in the slots between the teeth. This winding is designed to carry the induced high-frequency current, as will be more definitely described hereinafter. The teeth 8 of the polar members are located in proximity to the periphery of the rotatable armature 10 of the machine.

The polar members 6 are mechanically and magnetically connected by magnetic bridges 11. These bridges are of reduced cross-sectional area and are proportioned to become magnetically saturated by a portion of the total flux produced by the magnetizing windings. The magnetic bridges are designed to unite the polar members into a rigid mechanical construction thus reducing to a minimum the vibration of the field member during the operation of the machine. Preferably the magnetic bridges are formed by providing portions of reduced cross-sectional area in the magnetic circuit of the field member. In this manner the teeth upon the inner surface of the polar members may be made continuous, and, accordingly, the rotation of the armature within the field member is rendered smoother and less noisy.

The armature 10 has a winding 15 suitably arranged thereon which is adapted to be supplied with polyphase alternating current through the slip rings 12. A commutator 13 is carried by the armature and has its segments operatively connected to the armature winding. Direct current is taken from the commutator 13 by means of the brushes 14 and is supplied to the magnetizing windings 7, thus furnishing the magnetizing flux of the machine. The commutator and slip rings are preferably located at opposite ends of the armature, and are merely represented diagrammatically at the same end of Fig. 2.

The operation of my improved construction of dynamo-electric machine is as follows: When polyphase alternating current, for example, three phase current as diagrammatically illustrated in the drawings, is supplied to the armature winding through the slip rings the machine operates as a synchronous motor, the direct current for the excitation of the machine being obtained from the commutator. The rotation of the armature causes a variation in the magnetic flux in the teeth of the polar members and an alternating current is induced thereby in the winding 9. When an armature tooth is opposite a tooth, or a plurality of teeth as illustrated in the drawings, on the polar member, the magnetic flux in the latter is a maximum, and when an armature slot is opposite the same tooth, or plurality of teeth, on the polar member the magnetic flux is a minimum. The magnetic flux in the teeth on the polar members therefore undergoes one complete cycle during the passage of each armature tooth and adjacent slot. By suitable design of the number of armature teeth, the number of teeth on the polar members, and by variation of the number of poles of the machine any particular desired frequency, within a wide range, can be produced.

In order to secure the proper phase relation of the currents induced in the coils of the winding 9 the average center lines of the coils 9 should be spaced apart a distance corresponding to the distance between the center of a rotor tooth and the center of the adjacent rotor slot.

The magnetic bridges 11 constitute an important feature of my present invention. I have found that the use of such bridges is necessary in all dynamo-electric machines of the type herein described, regardless of the character of current employed in the machine for motive purposes. Without such a bridge the operation of these machines is commercially impracticable on account of the very objectionable noise occasioned by the vibration of the polar members and the rotation of the armature within a mechanically non-continuous magnetic field member. The use of the bridges reduces the noise in the machine to a negligible amount and furthermore does not affect the useful magnetizing flux of the machine to any objectionable extent. The cross-sectional area of the bridges is so proportioned that a small portion of the total flux saturates them and, accordingly, the remainder of the flux passes across the air-gap between the polar members and the armature core and is available as the working flux of the machine.

What I claim as new and desire to secure by Letters Patent of the United States, is:—

1. A dynamo-electric machine comprising in combination, a rotatable armature having teeth and a winding suitably arranged in slots between the teeth, means for conducting electric current to the armature winding, magnetic polar members having teeth arranged in proximity to the periphery of said armature, a winding carried in the slots between the teeth on said members, magnetizing windings on said polar members, and magnetic bridges of reduced cross-sectional area magnetically connecting said polar members and proportioned to be magnetically saturated during the normal operation of the machine.

2. A dynamo electric machine comprising in combination, a rotatable armature having teeth and a winding suitably arranged in slots between the teeth, means for conducting electric current to the armature winding, magnetic polar members having teeth arranged in proximity to the periphery of said armature, a winding carried in the slots between the teeth on said members, magnetizing windings on said polar members, and magnetic bridges forming a rigid mechanical connection between said polar members, said bridges being of reduced cross-sectional area and proportioned to become magnetically saturated by a portion of the total field flux.

3. A dynamo-electric machine comprising in combination, a rotatable armature having teeth and a winding suitably arranged in slots between the teeth, means for conducting electric current to the armature winding, a plurality of magnetic polar members having teeth arranged in proximity to the periphery of said armature, magnetizing windings mounted on said members, a winding carried in the slots between the teeth on the polar members, bridges of magnetic material connecting said polar members and providing a continuous path of magnetic material for the flux developed by the magnetizing windings, said bridges being of such cross-sectional area that they are magnetically saturated by a portion of the total field flux.

4. A dynamo-electric machine comprising in combination, a rotatable armature having teeth and a winding suitably arranged in slots between the teeth, means for conducting electric current to the armature winding, a magnetic field member comprising a continuous path of magnetic material for a portion of the field flux and having parts of reduced cross-sectional area proportioned to become magnetically saturated by a portion of the total field flux, teeth arranged on said member in proximity to said armature, a winding carried in the slots between the teeth on said member, and magnetizing windings on said member.

5. A dynamo-electric machine comprising in combination, a rotatable armature having teeth and a winding suitably arranged in slots between the teeth, means for conducting electric current to the armature winding, a magnetic field member having a continuous series of teeth arranged in proximity to the periphery of said armature and providing a continuous path of magnetic material for a portion of the field flux and having parts of reduced cross-sectional area proportioned to become magnetically saturated by a portion of the field flux, magnetizing windings on said member, and a winding carried in the slots between the teeth on said member.

6. A dynamo-electric machine comprising in combination, a rotatable armature having teeth and a winding suitably arranged in slots between the teeth, means for supplying polyphase alternating current to said armature winding, a magnetic field member having teeth arranged in proximity to the periphery of said armature, a winding carried in the slots between the teeth on said member, magnetizing windings on said member, and a commutator operatively connected to the armature winding and adapted to supply direct current to said magnetizing windings.

7. A dynamo-electric machine comprising in combination, a rotatable armature having teeth and a winding suitably arranged in slots between the teeth, means for supplying polyphase alternating current to said armature winding, a magnetic field member providing a continuous path of magnetic material for a portion of the field flux and having parts of reduced cross-sectional area proportioned to become magnetically saturated by a portion of the total field flux, teeth arranged on said member in proximity to said armature, a winding carried in the slots between the teeth on said member, magnetizing windings on said member, and a commutator operatively connected to the armature winding and adapted to supply direct current to said magnetizing windings.

8. A dynamo-electric machine comprising in combination, a rotatable armature having teeth and a winding suitably arranged in slots between the teeth, slip-rings for supplying polyphase alternating current to said armature winding, magnetic polar members having teeth arranged in proximity to the periphery of said armature, a winding carried in the slots between the teeth on said members, magnetizing windings on said polar members, magnetic bridges forming a rigid mechanical connection between said polar members, said bridges being of reduced cross-sectional area and proportioned to become magnetically saturated by a portion of the total field flux, and a commutator operatively connected to the armature winding and adapted to supply direct current to said magnetizing windings.

In witness whereof, I have hereunto set my hand this 17th day of June, 1913.

ERNST F. W. ALEXANDERSON.

Witnesses:
    BENJAMIN B. HULL,
    HELEN ORFORD.